(12) United States Patent
Langsdorf et al.

(10) Patent No.: US 9,731,898 B2
(45) Date of Patent: Aug. 15, 2017

(54) SLAT FOR A CONVEYOR

(71) Applicant: Transnorm System, Inc., Arlington, TX (US)

(72) Inventors: John Langsdorf, Bedford, TX (US); Harlen Hoang, Arlington, TX (US); Michael Hake, Flower Mound, TX (US); Rick Lee, Danville, KY (US)

(73) Assignee: TRANSNORM SYSTEM, INC., Arlington, TX (US)

( * ) Notice: Subject to any disclaimer, the term of this patent is extended or adjusted under 35 U.S.C. 154(b) by 0 days.

(21) Appl. No.: 14/768,703

(22) PCT Filed: Oct. 27, 2014

(86) PCT No.: PCT/US2014/062331
§ 371 (c)(1),
(2) Date: Aug. 18, 2015

(87) PCT Pub. No.: WO2015/073191
PCT Pub. Date: May 21, 2015

(65) Prior Publication Data
US 2016/0272430 A1    Sep. 22, 2016

Related U.S. Application Data

(60) Provisional application No. 61/902,885, filed on Nov. 12, 2013.

(51) Int. Cl.
| | | |
|---|---|---|
| B65G 21/18 | (2006.01) |
| B65G 17/24 | (2006.01) |
| B65G 17/06 | (2006.01) |
| B65G 17/08 | (2006.01) |
| B65G 21/20 | (2006.01) |
| B65G 17/30 | (2006.01) |

(52) U.S. Cl.
CPC ........... *B65G 17/24* (2013.01); *B65G 17/066* (2013.01); *B65G 17/086* (2013.01); *B65G 17/30* (2013.01); *B65G 21/18* (2013.01); *B65G 21/20* (2013.01); *B65G 2207/44* (2013.01)

(58) Field of Classification Search
CPC ...................................................... B65G 21/18
USPC ........................................ 198/778, 831, 850
See application file for complete search history.

(56) References Cited

U.S. PATENT DOCUMENTS

| | | |
|---|---|---|
| 3,627,109 A | 12/1971 | Cabak |
| 3,826,352 A | 7/1974 | Van Zon et al. |
| 4,194,616 A | 3/1980 | Barthelemy et al. |
| 4,645,070 A | 2/1987 | Homeier |
| 4,699,266 A | 10/1987 | Weiss |

(Continued)

FOREIGN PATENT DOCUMENTS

| | | |
|---|---|---|
| DE | 957 374 | 8/1956 |
| EP | 1 097 885 | 5/2001 |

(Continued)

OTHER PUBLICATIONS

EPO Abt. JP10067424, dated Mar. 10, 1998, Yoshiyuki.
EPO Abt. JP2002029618, dated Jan. 29, 2002, Ryosuke.

*Primary Examiner* — Leslie A. Nicholson, III
*Assistant Examiner* — Lester Rushin
(74) *Attorney, Agent, or Firm* — Kenneth F. Pearce (57) ABSTRACT

A slat for a conveyor that has one or more curves.

19 Claims, 7 Drawing Sheets

(56) References Cited

U.S. PATENT DOCUMENTS

| | | | |
|---|---|---|---|
| 4,729,470 A * | 3/1988 | Bacigalupe | B65G 17/061 104/140 |
| 5,081,750 A * | 1/1992 | Molz | B29C 55/165 198/838 |
| 5,176,247 A | 1/1993 | Counter et al. | |
| 5,277,386 A * | 1/1994 | Olsen | E21B 15/003 137/355.17 |
| 5,394,978 A | 3/1995 | Majewski | |
| 5,586,644 A | 12/1996 | Coen et al. | |
| 5,775,480 A | 7/1998 | Lapeyre et al. | |
| 6,336,551 B1 | 1/2002 | Balk | |
| 7,107,899 B2 * | 9/2006 | Nothum, Jr. | A21B 1/42 99/386 |
| 7,556,142 B2 | 7/2009 | Stebnicki et al. | |
| 7,854,315 B2 | 12/2010 | Stebnicki et al. | |
| 7,963,389 B2 * | 6/2011 | Broers | B65G 17/066 198/778 |
| 8,100,254 B2 | 1/2012 | Balk | |
| 8,276,746 B2 | 10/2012 | Klotzki | |
| 8,393,462 B2 | 3/2013 | Evans | |
| 8,490,272 B1 | 7/2013 | Langsdorf et al. | |
| 2005/0150748 A1 | 7/2005 | Zubair et al. | |

FOREIGN PATENT DOCUMENTS

| | | |
|---|---|---|
| JP | H10 67424 | 3/1998 |
| JP | 2002 029618 | 1/2002 |
| WO | WO 2012154030 | 11/2012 |
| WO | WO 2013144139 A1 | 10/2013 |

* cited by examiner

SLAT FOR A CONVEYOR

Applicants claim priority to PCT Application entitled—Slat for a Conveyor —, Serial No. PCT/US2014/062331, filed Oct. 27, 2014; Transnorm System, Inc. that claims priority to US provisional patent application entitled—Conveyor For Transporting Articles Along A Generally Vertical Path And Endless Carrier For A Conveyor—, Ser. No. 61/902,885, filed Nov. 12, 2013.

BACKGROUND OF THE INVENTION

A. Field of the Invention

Among other things, the present invention includes a slat compatible with conveyors having one or more curves.

B. Description of the Previous Art

Any discussion of references cited in this Description of the Previous Art merely summarizes the disclosures of the cited references and Applicant makes no admission that any cited reference or portion thereof is relevant prior art. Applicant reserves the right to challenge the accuracy, relevancy and veracity of the cited references.

1) U.S. Pat. No. 7,963,389—Broers et al. enables a conveyor. Among other things, Broers does not disclose a slat comprising: a first side capable of carrying articles; a central transverse axis; and a second side opposite the first side comprising landing gears on opposed sides of the central transverse axis, where each landing gear further comprises a wheel set apart from the second side and capable of engaging a surface distinct from the landing gear.

2) U.S. Pat. No. 6,336,551—Balk enables a conveyor. Among other things, Balk does not disclose a slat comprising: a first side capable of carrying articles; a central transverse axis; and a second side opposite the first side comprising landing gears on opposed sides of the central transverse axis, where each landing gear further comprises a wheel set apart from the second side and capable of engaging a surface distinct from the landing gear.

3) U.S. Pat. No. 3,627,109—Cabak enables a conveyor construction. Among other things, Cabak does not disclose a slat comprising: a first side capable of carrying articles; a central transverse axis; and a second side opposite the first side comprising landing gears on opposed sides of the central transverse axis, where each landing gear further comprises a wheel set apart from the second side and capable of engaging a surface distinct from the landing gear.

4) U.S. Pat. No. 3,826,352—Van Zon, et al. enables a spiral column for endless chain conveyor. Among other things, Van Zon does not disclose a slat comprising: a first side capable of carrying articles; a central transverse axis; and a second side opposite the first side comprising landing gears on opposed sides of the central transverse axis, where each landing gear further comprises a wheel set apart from the second side and capable of engaging a surface distinct from the landing gear.

5) U.S. Pat. No. 5,176,247—Counter, et al. enables a sideplexing conveyor chain including low centerline hinge pin. Among other things, Counter does not disclose a slat comprising: a first side capable of carrying articles; a central transverse axis; and a second side opposite the first side comprising landing gears on opposed sides of the central transverse axis, where each landing gear further comprises a wheel set apart from the second side and capable of engaging a surface distinct from the landing gear.

6) U.S. Pat. No. 5,775,480—Lapeyre, et al. enables a low-friction conveyor assembly. Among other things, Lapeyre does not disclose a slat comprising: a first side capable of carrying articles; a central transverse axis; and a second side opposite the first side comprising landing gears on opposed sides of the central transverse axis, where each landing gear further comprises a wheel set apart from the second side and capable of engaging a surface distinct from the landing gear.

7) U.S. Pat. No. 7,556,142—Stebnicki, et al. enables a conveyor plate with integrated roller. Among other things, Stebnicki does not disclose a slat comprising: a first side capable of carrying articles; a central transverse axis; and a second side opposite the first side comprising landing gears on opposed sides of the central transverse axis, where each landing gear further comprises a wheel set apart from the second side and capable of engaging a surface distinct from the landing gear.

8) U.S. Pat. No. 7,854,315—Stebnicki, et al. enables a conveyor plate with integrated roller. The '315 patent is a divisional patent flowing from U.S. Pat. No. 7,556,142—Stebnicki, et al. Thus, the '315 patent provides the same disclosure as the '142 patent.

9) U.S. Pat. No. 4,645,070—Homeier enables a dual bend conveyor. Among other things, Homeier does not disclose a slat comprising: a first side capable of carrying articles; a central transverse axis; and a second side opposite the first side comprising landing gears on opposed sides of the central transverse axis, where each landing gear further comprises a wheel set apart from the second side and capable of engaging a surface distinct from the landing gear.

10) US Published Patent Application 20050150748—Zubair, et al. discloses a low-friction conveyor. Among other things, Zubair does not disclose a slat comprising: a first side capable of carrying articles; a central transverse axis; and a second side opposite the first side comprising landing gears on opposed sides of the central transverse axis, where each landing gear further comprises a wheel set apart from the second side and capable of engaging a surface distinct from the landing gear.

11) WO 2012154030—Ooi, B., et al. discloses a link for a conveyor chain, a conveyor chain made up of said links and a method of operation of said conveyor chain. Among other things, Ooi does not disclose a slat comprising: a first side capable of carrying articles; a central transverse axis; and a second side opposite the first side comprising landing gears on opposed sides of the central transverse axis, where each landing gear further comprises a wheel set apart from the second side and capable of engaging a surface distinct from the landing gear.

SUMMARY OF THE INVENTION

Unlike prior art systems, the current invention utilizes a novel and nonobvious endless carrier including slats having landing gears carrying wheels set apart from the slat, where the wheels are capable of engaging a surface distinctive from the landing gears.

An aspect of a preferred embodiment of the current invention is to provide slats with landing gears including wheels.

Another aspect of a preferred embodiment of the present invention is to provide an endless carrier for a conveyor where the combination of the slat, the landing gears and the wheels reduces friction encountered by the endless carrier as the endless carrier moves about the support supporting the endless carrier.

Still another aspect of a preferred embodiment of the current invention is to provide slats with landing gears and wheels capable of reducing the weight-load resistance encountered by the endless carrier as the endless carrier moves articles over the article's transportation path.

Another aspect of a preferred embodiment the present invention is to better distribute the various load stresses encountered by the slat across the length of slat rather than have the load stresses concentrated near the center-point of the slat.

Still another aspect of a preferred embodiment of the present invention is to provide a stable slat whether the load is carried about the center of the slat or near the slat's lateral edges.

Yet another aspect of a preferred embodiment of the present invention is to provide a landing gear that is integral with the slat.

Another aspect of a preferred embodiment of the present invention is to provide landing gears that improve vertical stability of the slats whether the weight load is distributed proximate the slat's center or about the slat's lateral edges.

Still another aspect of a preferred embodiment of the current invention is to simplify the structures required for restraining the tendency of the endless carrier to pull away from the endless carrier's support as the endless carrier moves through one or more curves associated with the conveyor's article transportation path.

Yet another aspect of a preferred embodiment of the present invention is to provide a landing gear with a wheel capable of engaging the endless conveyor's support where the vertical and horizontal movement of the landing gear can be limited while rotational movement of the wheel is not limited.

Still another aspect of a preferred embodiment of the present invention is to provide a landing gear/wheel combination that limits movement of the slat to a predetermined range for improving the slat's carrying performance and safe usage.

A preferred embodiment of the current invention can be described as a conveyor utilizing a plurality of slats; the conveyor comprising: a) a helical support comprising: i) a first track, wherein at least a portion of the first track spirals simultaneously with the helical support; ii) a second track, opposite the first track, wherein at least a portion of the second track spirals simultaneously with the helical support; and iii) a wall positioned between the first track and the second track; wherein at least a portion of the wall spirals simultaneously with the helical support; b) the plurality of slats traveling an endless pathway about the helical support; each slat having a superior article carrying side and an opposed side; wherein the opposed side further comprises: i) a first landing gear integral with the slat carrying a first wheel for engaging the first track, wherein vertical and horizontal movement but not rotational movement of the rotatable first wheel is limited by contact with the first track; and ii) a second landing gear integral with the slat carrying a second wheel for engaging the second track, wherein vertical and horizontal movement but not rotational movement of the second wheel is limited by contact with the second track; and c) a drive driving the plurality of slats.

Another preferred embodiment the current invention can be described as a conveyor utilizing a plurality of slats comprising: a) a support comprising: i) a first track routed about a first side of the support; and ii) a second track routed about a second side of the support; b) the plurality of slats defining a movable endless carrier traversing the support, wherein each slat has a superior article carrying side and an opposed side, and wherein the opposed side of each slat further comprises: i) a first landing gear carrying a first wheel for engaging the first track, wherein vertical and horizontal movement of the first wheel is limited by the first track; and ii) a second landing gear carrying a second wheel for engaging the second track, wherein vertical and horizontal movement of the second wheel is limited by the second track; and c) a drive driving the endless carrier.

Still another preferred embodiment the current invention can be described as an endless plurality of slats driven about a support, wherein the support comprises a first track proximate a first side of the support and a second track proximate a second side of the support, wherein each of the plurality of slats comprises an article carrying side and an opposed side, and wherein one or more of the opposed sides comprises: a) a first landing gear carrying a first wheel for engaging the first track for limiting vertical and horizontal movement but not rotational movement of the first wheel; and b) a second landing gear carrying a second wheel for engaging the second track for limiting vertical and horizontal movement but not rotational movement of the first wheel.

Yet another preferred embodiment of the current invention can be described as an endless plurality of slats driven about a support, wherein the support comprises a first track proximate a first side of the support and a second track proximate a second side of the support, wherein each of the plurality of slats comprises an article carrying side and an opposed side, and wherein one or more of the opposed sides comprises a first landing gear carrying a first wheel for engaging the first track and a second landing gear carrying a second wheel for engaging the second track.

Yet still another preferred embodiment of the current invention can be described as an endless plurality of slats driven about a support, wherein each of the plurality of slats comprises an article carrying side, an opposed side and a central transverse axis, and wherein one or more of the opposed sides comprises: a) a first landing gear carrying a first wheel set apart from the opposed side, wherein the first landing gear is located on a first side of the central transverse axis; and b) a second landing gear carrying a second wheel set apart from the opposed side, wherein the second landing gear is located on a second side of the central transverse axis.

Yet another preferred embodiment of the current invention can be described as a slat for an endless carrier of a conveyor; the slat comprising a superior article carrying side and an opposed side, wherein the opposed side further comprises first and second landing gears carrying wheels traversing an approximate distance of an article transportation path and engaging opposed tracks associated with the article transportation path of the conveyor.

Still another preferred embodiment of the current invention can be described as a slat for an endless loop traversing a conveyor; the slat comprising: a) a first side capable of carrying articles; b) a central transverse axis; and c) a second side opposite the first side; the second side comprising landing gears on opposed sides of the central transverse axis, wherein each landing gear further comprises a wheel set apart from the second side and capable of engaging a surface distinct from the landing gear.

It is the novel and unique interaction of these simple elements which creates the system within the ambit of the present invention. Select preferred embodiments of the current invention have been disclosed and enabled as required by Title 35 of the United States Code. However, it is to be understood that the descriptions of the preferred embodiments do not limit the scope of the present invention.

DESCRIPTION OF THE PREFERRED EMBODIMENTS

Among other things, the present invention is a slat for a conveyor. Preferred embodiments of the current slat are compatible with a plethora of conveyors, including straight conveyors, curved conveyors as well as conveyors having both straight and curved sections. Preferred embodiments of the current slat can be attached together by any means acceptable in the art to form an endless loop that traverses about the conveyor. Each slat has a first side for carrying articles, a central transverse axis and a second side opposite the first side that is provided with landing gears on opposed sides of the central transverse axis. A wheel is set apart from the second side of the slat and carried by the landing gear such that the wheel is capable of engaging a surface that is distinct from the landing gear.

For many years, the conveyor industry has utilized conveyors with slats to move articles. Most of the prior art slats ride against the slat support and generate frictional resistance. Such friction forces decrease the efficiency of such conveying systems while simultaneously increasing the power consumption and wear and tear of such conveying systems.

Some manufacturers of conveying slats have attempted to reduce frictional resistance by incorporating bearings into the slats. In such prior slat systems, the bearings contact the slat support at angles other than generally normal to the slat. The prior use of these radially located bearings requires the use of oversized bearings and decreases the efficiency of these systems. Because Applicants' landing gear/wheel combination is generally perpendicular to the slat, the current invention can pull greater package loads than the prior systems while the landing gear/wheel combination results in the present invention pulling lesser conveyor loads than prior systems. Through experimentation, the inventors have discovered that integral slat/landing gear/wheel combinations are well suited for the practice of the current invention. By way of example, integral slat/landing gear/wheel combinations have fewer parts to wear out and are easier to assemble and replace.

Figure 1:
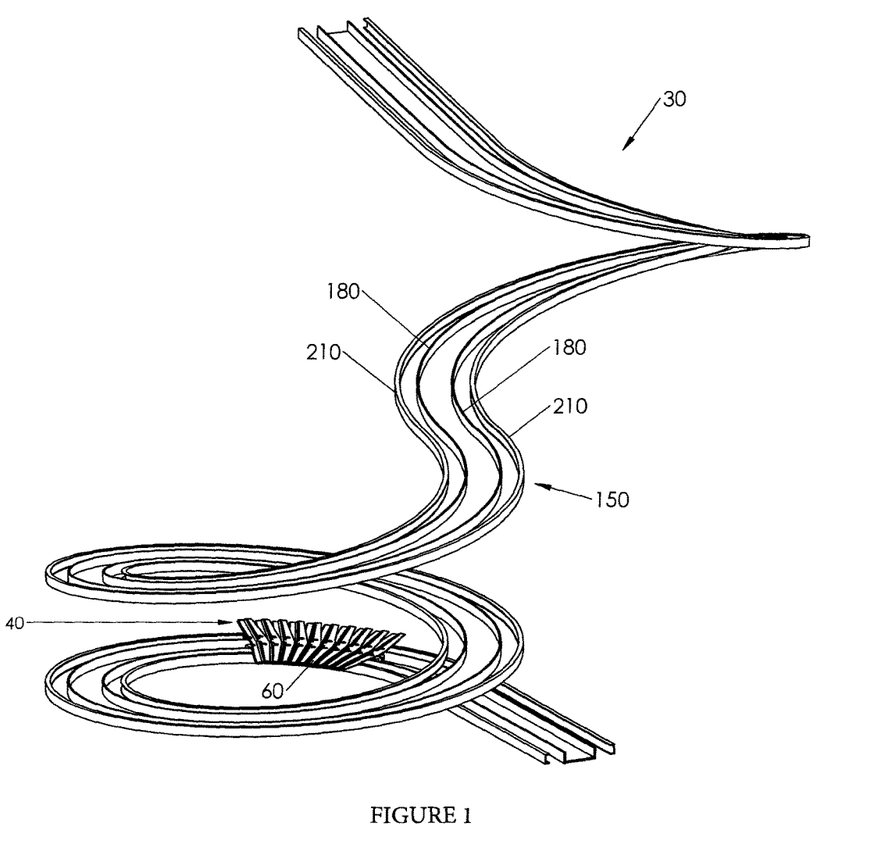
FIG. 1 is an isometric view that shows a conveyor incorporating multiple curves and opposed tracks for interacting with wheels associated with the slats' landing gears.

FIG. 1 is an isometric view depicting a slat support (150) of conveyor (30) incorporating multiple curves, walls (180) and opposed tracks (210) for interacting with wheels associated with the slats' landing gears. Slat support (150), walls (180) and opposed tracks (210) are supported by any conveyor frame (not shown) acceptable in the art. In this view, except for the section of slats (60) of endless carrier (40) illustrated in FIG. 1, the remaining slats (60) of endless carrier (40) have been cut away to reveal slat support (150). Among other things, the FIG. 1 slat support (150) illustrates varying height, pitch, radius and direction.

Figure 2:
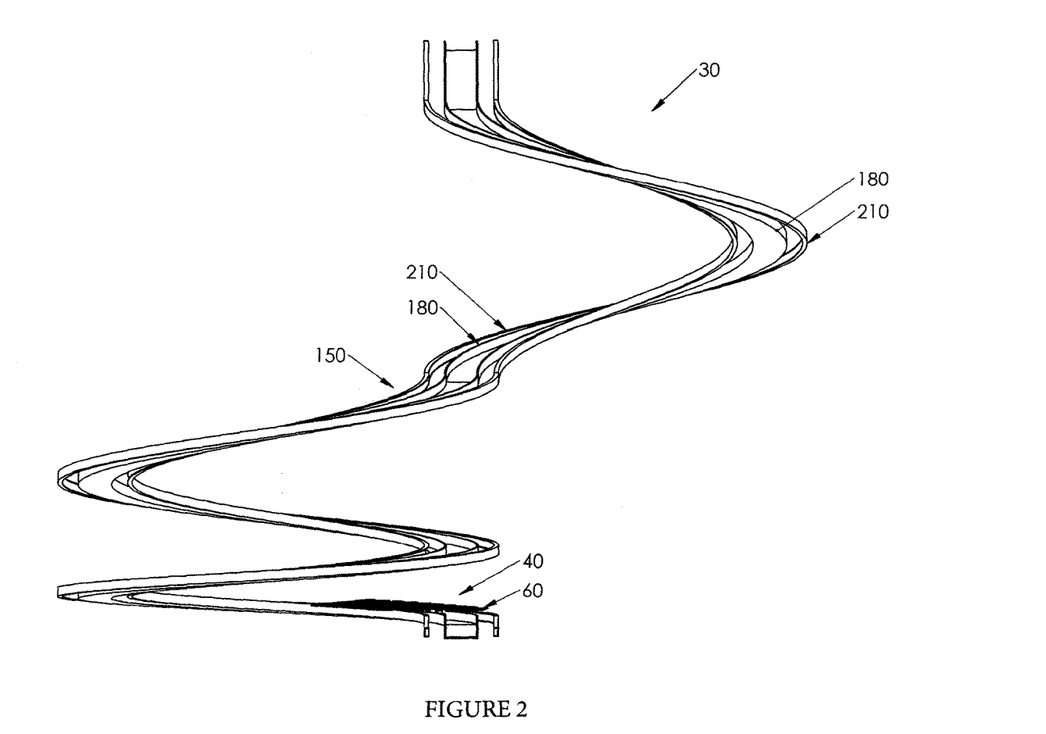
FIG. 2 is an isometric view that shows a conveyor incorporating multiple curves and opposed tracks for interacting with wheels associated with the slats' landing gears.

FIG. 2 is an isometric view depicting a slat support (150) of conveyor (30) incorporating multiple curves, walls (180) and opposed tracks (210) for interacting with wheels associated with the slats' landing gears. Slat support (150), walls (180) and opposed tracks (210) are supported by any conveyor frame (not shown) acceptable in the art. In this view, except for the section of slats (60) of endless carrier (40) illustrated in FIG. 2, the remaining slats (60) of endless carrier (40) have been cut away to reveal slat support (150). Among other things, the FIG. 2 slat support (150) illustrates varying height, radius and direction.

Figure 3:
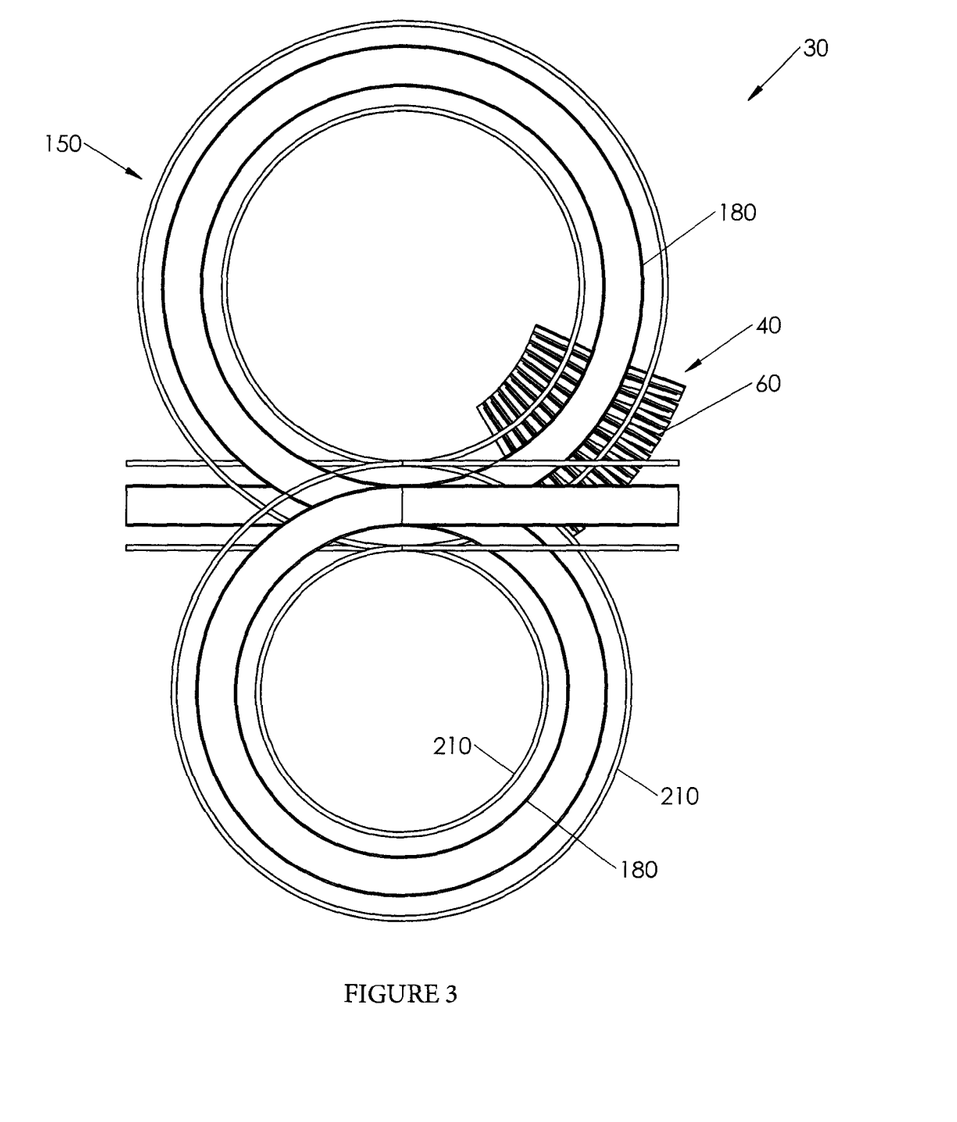
FIG. 3 is a top view of a conveyor incorporating multiple curves and opposed tracks for interacting with wheels associated with the slats' landing gears.

FIG. 3 is a top view depicting a slat support (150) of conveyor (30) incorporating multiple curves, walls (180) and opposed tracks (210) for interacting with wheels associated with the slats' landing gears. Slat support (150), walls (180) and opposed tracks (210) are supported by any conveyor frame (not shown) acceptable in the art. In this view, except for the section of slats (60) of endless carrier (40) illustrated in FIG. 3, the remaining slats (60) of endless carrier (40) have been cut away to reveal slat support (150). Among other things, the FIG. 3 slat support (150) illustrates varying height, radius and direction.

Figure 4:
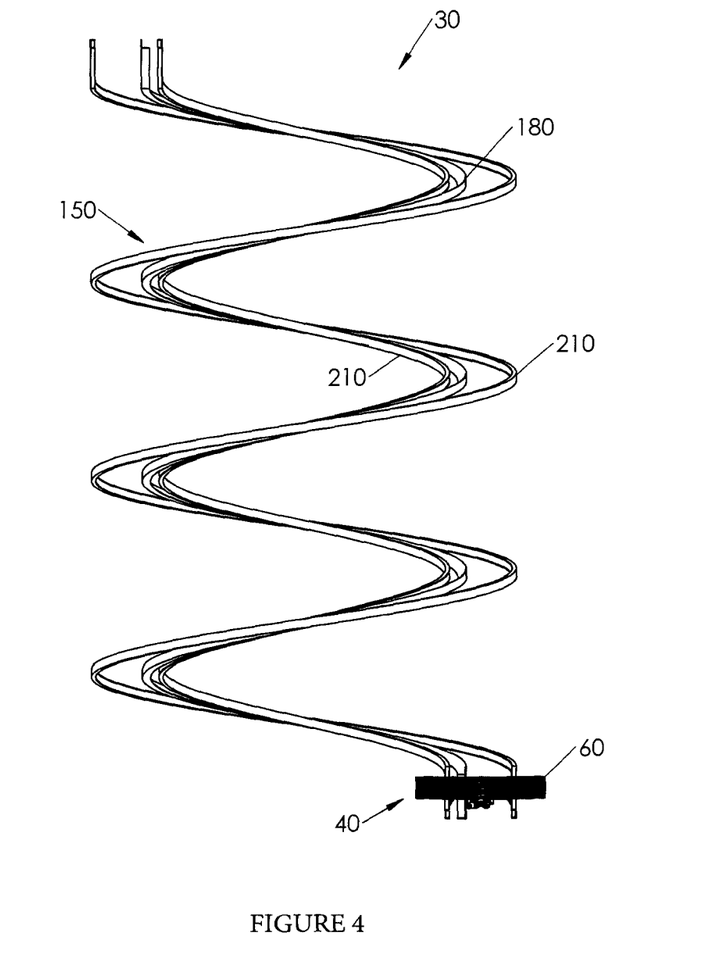
FIG. 4 is a perspective of a spiral conveyor and opposed tracks for interacting with wheels associated with the slats' landing gears.

FIG. 4 is a perspective of a spiral slat support (150) of conveyor (30) incorporating multiple curves, wall (180) and opposed tracks (210) for interacting with wheels associated with the slats' landing gears. Slat support (150), wall (180) and opposed tracks (210) are supported by any conveyor frame (not shown) acceptable in the art. In this view, except for the section of slats (60) of endless carrier (40) illustrated in FIG. 4, the remaining slats (60) of endless carrier (40) have been cut away to reveal slat support (150). Among other things, the FIG. 4 slat support (150) illustrates constant pitch, radius and direction.

Figure 5:
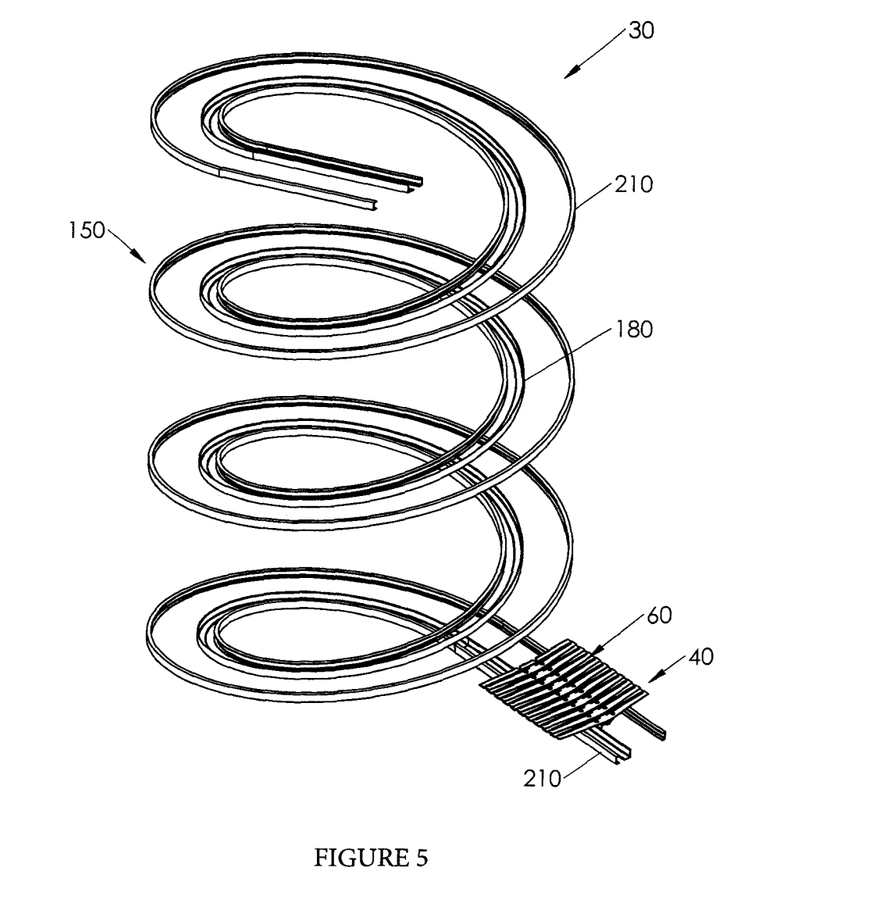
FIG. 5 is an isometric view that shows a helical conveyor incorporating multiple curves and opposed tracks for interacting with wheels associated with the slats' landing gears.

FIG. 5 is an isometric view of a helical slat support (150) of conveyor (30) incorporating multiple curves, wall (180) and opposed tracks (210) for interacting with wheels associated with the slats' landing gears. Slat support (150), wall (180) and opposed tracks (210) are supported by any conveyor frame (not shown) acceptable in the art. In this view, except for the section of slats (60) of endless carrier (40) illustrated in FIG. 5, the remaining slats (60) of endless carrier (40) have been cut away to reveal slat support (150). Among other things, the FIG. 5 slat support (150) illustrates constant pitch, radius and direction.

Figure 6:
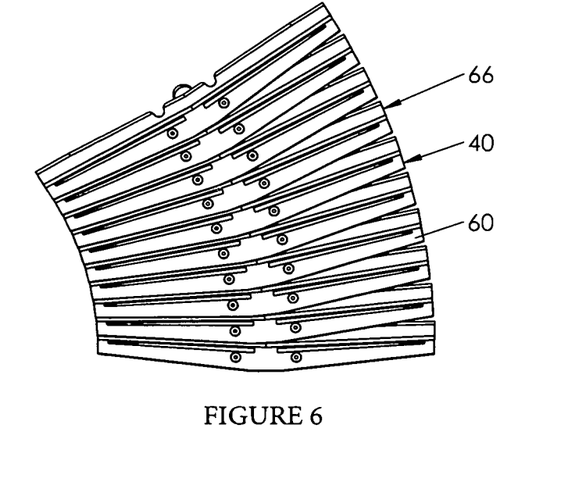
FIG. 6 illustrates a preferred embodiment of slats in accordance with the present invention.
Figure 7:
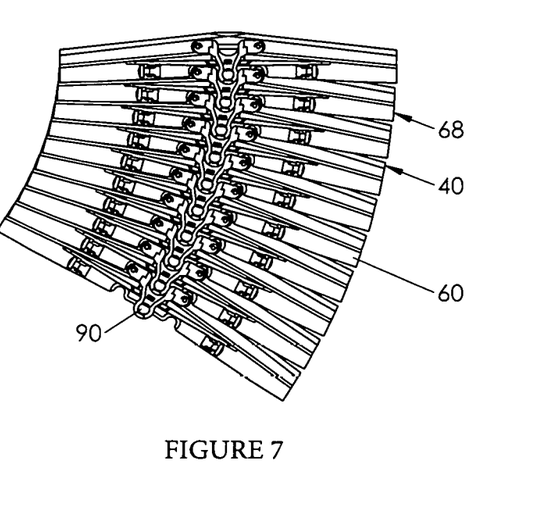
FIG. 7 is an view of the inferior sides of a section of slats of the endless carrier.

FIG. 6 illustrates a preferred embodiment of slats (60) in accordance with the present invention. FIG. 6 is a top view of superior article carrying or first sides (66) of a section of slats (60) of endless carrier (40). FIG. 7 is a view of second or opposed sides (68) of a section of slats (60) of endless carrier (40). As shown in FIG. 7, chain (90) interconnects opposed sides (68) of slats (60). Chain or interconnected links (90) can be driven by any drive (not shown in this view) acceptable in the art for driving endless carrier (40) about conveyor (30).

Within the scope of the current invention, preferred embodiments of the slats (60) and landing gears (80f, 80s) can be manufactured of high strength polymer or other synthetics. A preferred embodiment of a landing gear's wheel or wheels (82f, 82s) can include high precision sealed or unsealed bearings. By way of example, select preferred embodiments of the current slats have: a thickness of about 3.2 centimeters; a length of about 61 centimeters; and a weight of about 340 grams.

Figure 8:
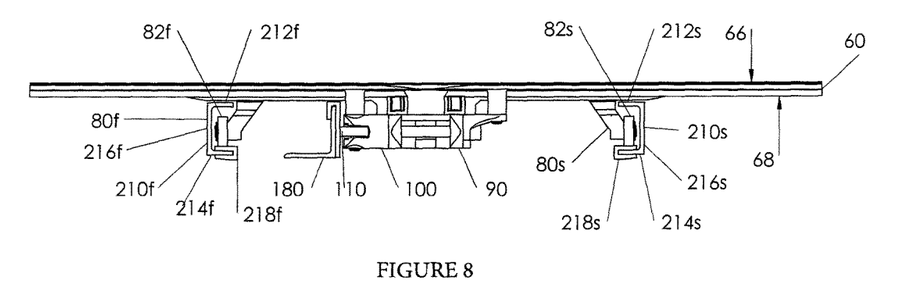
FIG. 8 is a rear view of a preferred embodiment of a slat of the endless carrier.
Figure 9:
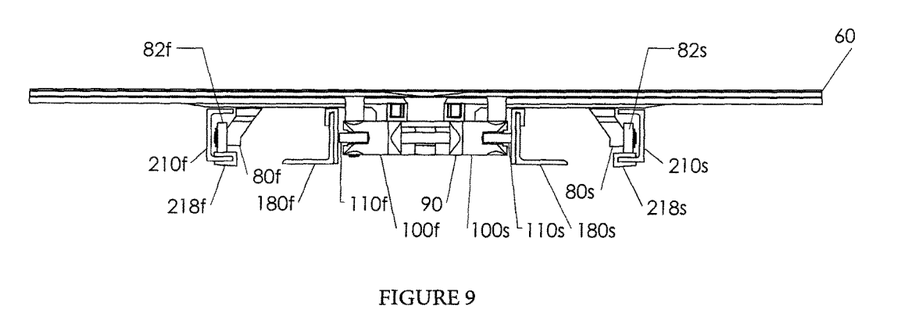
FIG. 9 is a rear view of a preferred embodiment of a slat of the endless carrier.

FIGS. 8 and 9 are rear views of preferred embodiments of slat (60) of endless carrier (40). Slat (60) includes superior side (66) and second side (68). For the section of endless carrier (40) transporting articles, second side (68) is superior to tracks (210f, 210s) receiving wheels (82f, 82s) carried by landing gears (80f, 80s) depending from second side (68) of slat (60). Landing gears (80f, 80s) can be integral with slat (60) or attached to slat (60) via any means acceptable in the art. As shown, wheels (82f, 82s) are carried by landing gears (80f, 80s) and are set apart from second side (68) of slat (60) such that wheels (82f, 82s) can engage a surface that is distinct from landing gears (80f, 80s) and slat (60). Further, in select preferred embodiments of endless carrier (40), it is not required that landing gears (80f, 80s) are attached to every slat (60) of endless carrier (40) for functionality of endless carrier (40).

Preferred embodiments of tracks (210f, 210s) are provided with upper rails (212f, 212s), lower rails (214f, 214s) and connecting members (216f, 216s). The combination of upper rails (212f, 212s), lower rail (214f, 214s) and connecting member or connectors (216f, 216s) controls the vertical and horizontal movements but not the rotational movements of wheels (82f, 82s) of landing gear (80f, 80s). Construction of tracks (210f, 210s) in accordance with select preferred embodiments of the current invention allows tracks (210f, 210s) to capture wheels (82f, 82s) and enhances safer use of endless carrier (40). Select preferred embodiments of track (210) are provided with lower rail (214f, 214s) protectors (218f, 218s) for increasing the wearability of tracks (210f, 210s).

As shown in the preferred embodiment of FIG. 8, clevis (100) carrying roller bearing (110) is attached to link (90). Roller bearing (110) engages wall (180) and assists endless carrier's (40) movement through a curve of conveyor (30). Preferred embodiments of the structures portrayed in FIG. 8 are generally used for conveyors having one or more curves only in a single direction. Within the scope of the preferred embodiment disclosed in FIG. 8, the attachment of a clevis (100) to each link is not required for functionality of link (90) of the chain within the scope of the current invention. And for select conveyors, a clevis is not required for functionality of endless carrier (40).

FIG. 9 is a rear view of a preferred embodiment of slat (60) of endless carrier (40). As shown in the preferred embodiment disclosed in FIG. 9, two devises (100f, 100s) carrying roller bearings (110f, 110s) are attached to opposed sides of chain (90). Each roller bearing (110f, 110s) engages a wall (180f, 180s) and assists endless carrier's (40) movement through curves of conveyor (30). Preferred embodiments of the structures portrayed in FIG. 9 are generally used for conveyors having curves in more than a single direction.

As shown in the preferred embodiment of FIG. 9, devises (100f, 100s) carrying roller bearings (110f, 110s) are attached to link (90) of chain. Roller bearings (110f, 110s) engage walls (180f, 180s) and assist endless carrier's (40) movement through curves of conveyor (30). Preferred embodiments of the structures portrayed in FIG. 9 are generally used for conveyors having curves in more than a single direction. Within the scope of the preferred embodiment disclosed in FIG. 9, the attachment of a clevis (100f or 100s) to each link (90) is not required for functionality of endless carrier (40).

Pursuant to Title 35 of the United States Code, preferred embodiments of the current system invention have been disclosed and enabled.

What is claimed is:

1. A conveyor utilizing a plurality of slats; said conveyor comprising:
    a) a helical support comprising:
        i) a first track, wherein at least a portion of said first track extends simultaneously with said helical support;
        ii) a second track separate from said first track, wherein at least a portion of said second track extends simultaneously with said helical support; and
        iii) a wall positioned between said first track and said second track; wherein at least a portion of said wall spirals simultaneously with said helical support;
    b) said plurality of slats traveling an endless pathway about said helical support; each slat having a superior article carrying side and an opposed side; wherein said opposed side further comprises:
        i) a first landing gear integral with said slat carrying a first wheel for engaging said first track, wherein vertical and horizontal movement but not rotational movement of said first wheel is limited by contact with said first track; and
        ii) a second landing gear integral with said slat carrying a second wheel for engaging said second track, wherein vertical and horizontal movement but not rotational movement of said second wheel is limited by contact with said second track; and
    c) a drive driving said plurality of slats.

2. The conveyor of claim 1, wherein each of said tracks comprises an upper rail, a lower rail and a connector extending between said upper rail and said lower rail.

3. An endless plurality of slats driven about a support, wherein said support comprises a first track proximate a first side of said support and a second track separate from said first track, proximate a second side of said support, wherein each of said plurality of slats comprises an article carrying side and an opposed side, and wherein one or more of said opposed sides comprises:
    a) a first landing gear carrying a first wheel for engaging said first track for limiting vertical and horizontal movement but not rotational movement of said first wheel such that said first wheel rotates in a first plane generally perpendicular to said slat; and
    b) a second landing gear carrying a second wheel for engaging said second track for limiting vertical and horizontal movement but not rotational movement of said second wheel such that said second wheel rotates in a second plane generally perpendicular to said slat.

4. The support of claim 3, wherein each of said tracks comprises an upper rail, a lower rail and a connector extending between said upper rail and said lower rail.

5. The support of claim 4, wherein said landing gears are integral with said slat.

6. The support of claim 5, wherein some of said rails comprise protectors contactable by said wheels.

7. A conveyor comprising:
    a) a plurality of slats comprising article carrying sides, opposed sides and a central transverse axis for each said slat, wherein one or more of said opposed sides comprises:
        i) a first landing gear, carrying a first wheel, located on a first side of said central transverse axis; and ii) a second landing gear, carrying a second wheel, located on a second side of said central transverse axis; and b) a support for said slats; said support comprising two tracks separate from each other and positioned on opposite sides of a wall of said conveyor; said tracks engaging at least some of said wheels, wherein at least one of said tracks comprises an upper rail and a lower rail.

8. The conveyor of claim 7 further comprising a connector extending between said upper rail and said lower rail.

9. The conveyor of claim 8, wherein said lower rail further comprises a protector.

10. The conveyor of claim 9, wherein said landing gears are integral with said slat.

11. A slat for an endless carrier of a conveyor; said slat comprising a superior article carrying side and an opposed side, wherein said opposed side further comprises first and second landing gears carrying wheels traversing an approximate distance of an article transportation path of said conveyor; said conveyor further comprising tracks, distinct from each other, limiting vertical and horizontal movement of said wheels, wherein axes of rotation of said wheels are parallel said article transportation path.

12. The slat of claim 11, wherein said first and second landing gears are integral with said slat.

13. The opposed tracks of claim 12, wherein at least one of said tracks comprises an upper rail and a lower rail.

14. The opposed tracks of claim 13 further comprising a connector extending between said upper rail and said lower rail.

15. The support of claim 14, wherein at least one of said rails comprises a protector contactable by said wheels.

16. A slat for an endless loop traversing a conveyor; said slat comprising:

a) a first side adapted for carrying articles;

b) a central transverse axis; and c) a second side opposite said first side; said second side comprising landing gears on opposed sides of said central transverse axis, wherein each landing gear further comprises a wheel, set apart from said second side, including an axis of rotation parallel said slat; each said wheel adapted to engage a surface distinct from that of its opposed wheel, wherein at least one of said distinct surfaces limits vertical and horizontal movement of said wheels contacting said one distinct surface.

17. The said one distinct surface of claim 16 comprising an upper rail and a lower rail supported by said conveyor.

18. The said one distinct surface of claim 17 comprising a connector extending between said upper rail and said lower rail.

19. The said one distinct surface of claim 18 comprising a protector contactable by said wheels.

* * * * *